Patented Sept. 19, 1922.

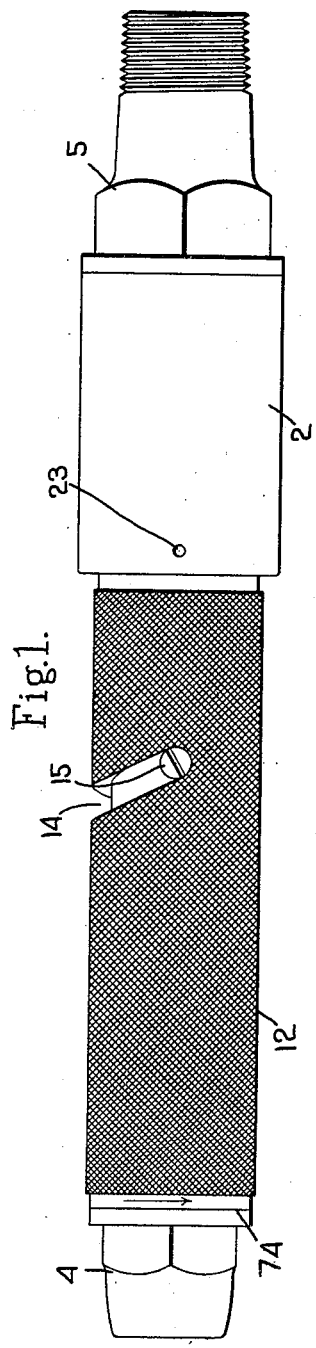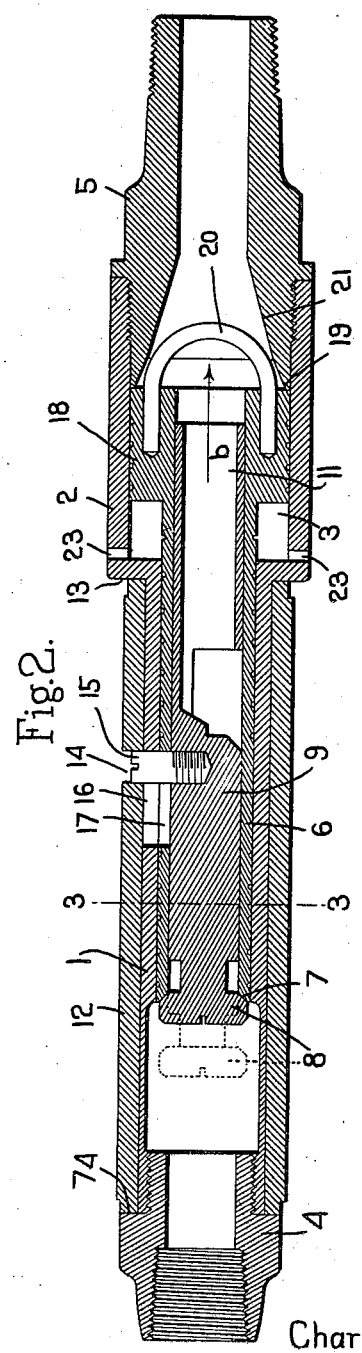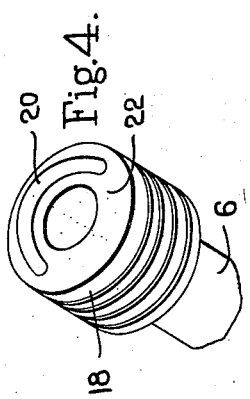

1,429,325

UNITED STATES PATENT OFFICE.

CHARLES C. CHENEY, OF CHARLESTOWN, MASSACHUSETTS.

AUTOMATIC CONTROL FOR COMPRESSED-AIR-ACTUATED MACHINES.

Application filed March 29, 1921. Serial No. 456,681.

*To all whom it may concern:*

Be it known that I, CHARLES C. CHENEY, a citizen of the United States, and resident of Charlestown, county of Suffolk, State of Massachusetts, have invented an Improvement in Automatic Control for Compressed-Air-Actuated Machines, of which the following description, in connection with the accompanying drawing, is a specification, like characters on the drawing representing like parts.

This invention relates to a valve device for controlling the delivery of compressed air to machines which are actuated by compressed air, such for instance, as drilling machines, pneumatic hammers and the like, and the principal object of the invention is to provide an improved valve of this type which is constructed so that it can be manually manipulated to open and close the valve, and which is also constructed so that if a pressure builds up on the delivery side of the valve due to the sticking of the drill or other implement being used, the valve will be automatically closed to shut off further delivery of air.

My improved valve comprises a housing, a tubular valve seat member mounted within said housing and having a valve seat at one end, a valve capable of being manually moved toward and from the valve seat to close and open passage way through which the air passes.

The valve seat member is slidably mounted in the housing and is so constructed that when an air pressure builds up on the delivery end thereof, such valve seat member will be moved relative to the housing toward the valve thereby to bring the valve seat into engagement with the valve, thus closing the port or air passage way.

The valve is therefore opened and closed by moving the valve away from and towards the valve seat, but the valve is closed automatically when an air pressure builds up on the delivery end by movement of the valve seat member toward the valve.

In order to give an understanding of my invention I have illustrated in the drawings a selected embodiment thereof which will now be described after which the novel features will be pointed out in the appended claims.

Fig. 1 is a side view of a valve embodying my invention.

Fig. 2 is a longitudinal sectional view.

Fig. 3 is a section on the line 3—3, Fig. 2.

Fig. 4 is a fragmentary transverse view showing one end of the valve seat member.

The housing in my improved valve is indicated at 1 and it is in the form of a tubular member having one end enlarged somewhat, as shown at 2, said end having within it a chamber 3 that is larger in diameter than the diameter of the opening through the main portion of the housing. The housing is provided at one end with a connection 4 and is provided at the other end with a connection 5 to which may be secured a suitable pipe leading to the machine to be operated.

Situated within the tubular housing 1 is a valve seat member 6 which is also tubular in construction and is provided at one end with an annular valve seat 7 that surrounds the airway or port through which the air passes. The valve for closing this airway or port is indicated at 8 and it is constructed to seat against the valve seat 7 when it is closed. Said valve is provided with a stem 9 which is located within and extends longitudinally of the valve seat member 6, said stem being provided with a longitudinal extending port 10 through which the air is delivered. The end 11 of the stem is shown as tubular and it has a sliding fit with the interior of the valve seat member 6.

The valve is manually manipulated by means of a control sleeve 12 which encircles the housing and is confined between the shoulder 13 formed by the enlarged portion 12 and a shoulder 74 formed on the connection 4. This control sleeve 12 is provided with an inclined slot 14 in which is received a pin 15 that is rigid with the valve stem 9, said pin extending through slots 16 and 17 formed in the housing 1 and valve seat member 6.

With this construction it will be obvious that a turning of the sleeve 12 in the direction of the arrow Fig. 1 will operate through the slot 14 and pin 15 to move the valve 8 to the left into the dotted line position, thereby opening the port through the valve seat member and allowing the air to pass from the inlet to the outlet. A turning of the sleeve in the opposite direction will obviously close the valve.

The valve seat member 6 is slidably mounted in the housing 1 and a construction is provided whereby if a pressure builds up at the outlet end of the device for any reason, such for instance, as because a drill sticks, such increased pressure will operate automatically to move the valve seat member to the left Fig. 2 so as to bring the valve seat against the valve when in its dotted line position, thereby closing the port way. The valve seat member 6 is provided at its right hand end with an enlarged head 18 which fits the chamber 3 and is slidably mounted therein. The valve seat member is so constructed that the action of the air in passing therethrough will tend to hold it in its normal position shown in Fig. 2, that is with the head 18 against the shoulder formed by the inner end 19 of the connection 5. I have herein provided for this by employing a loop 20 at the end of the head 18 and situated so that it intersects the axial line of the head. The air current which passes through the valve seat member in the direction of the arrow $b$ will impinge on this loop 20 and will thus exert a constant force tending to holding the valve member in its normal position.

The bore of the connection 5 is enlarged at its inner end as shown at 21 thereby exposing the entire surface 22 at the end of the head 18.

When the valve is open thereby to admit air through the port the valve will be occupying the dotted line position Fig. 2 and the current of air moving in the direction of the arrow $b$ will hold the valve seat member in the position shown in Fig. 2 so long as the machine is operating properly to take the air as fast as it is delivered. If, however, for any reason, such for instance, as because a drill sticks, an undue pressure is built up at the delivery end of the device, then this pressure acting on the end 22 of the head will force the valve seat member 6 to the left and will thus carry the valve seat 7 up against the valve while the latter is in its dotted line position. This will close the port through the device and automatically shut off the air. The chamber 3 is provided with suitable vent ports 23 to permit the head 18 to move freely to the left under circumstances such as above described.

The valve is therefore operated manually by moving it toward and from the valve seat, but the automatic operation of closing the valve when undue pressure builds up at the delivery end is accomplished by moving the valve seat toward the open valve.

The valve may be opened after having been thus automatically closed by rotating the control sleeve 12 in the direction opposite to the arrow in Fig. 1, such rotation operating to move both the valve seat member and valve back into the position shown in Fig. 2 without, however, opening the valve. After the valve seat member and valve have thus been restored to normal position the valve may be opened by again turning the control sleeve 12 in the direction of the arrow, Fig. 1, as above described.

My invention is quite simple in construction and it has the advantage that all the parts necessary for both manually and automatic operation of the valve are contained in a single housing. It has the further advantage that the same elements are used in closing the port way manually and automatically.

I claim.

1. In an automatic control valve for compressed-air-actuated machines, the combination with a tubular housing, of a tubular valve seat member slidably mounted within the housing and having a valve seat at one end, a valve to close said valve seat, and manually operable means to open the valve away from the valve seat, said valve seat member being constructed so that it will be moved relative to the housing to carry the valve seat against the opened valve whenever a pressure builds up at the discharge end of the housing.

2. In a device of the class described, the combination with a tubular housing, of a tubular valve seat member slidably mounted within the housing and having a valve seat at one end, a valve to close said valve seat and manually operable means to move the valve relative to the valve seat, said valve seat member being provided at the discharge end with a head which is exposed to any pressure which may build up at the discharge end whereby such pressure will act against the head to shift the valve seat member automatically into position to close the valve, said valve seat member being held in its normal position by the air current passing therethrough.

3. In a device of the class described, the combination with a tubular housing, of a tubular valve seat member slidably mounted within the housing and having a valve seat at one end, a valve to close said valve seat, manually operable means to move the valve from and towards the valve seat and means carried by the valve seat member and acted on by the current of air passing therethrough to hold said valve seat member in normal position, said valve seat member being provided at its discharge end with a head which is exposed to any pressure which may build up at the discharge end whereby such pressure will act against the head to shift the valve seat member automatically into position to close the valve.

In testimony whereof, I have signed my name to this specification.

CHARLES C. CHENEY.